US012719322B2

(12) United States Patent
Schauer

(10) Patent No.: US 12,719,322 B2
(45) Date of Patent: Aug. 25, 2026

(54) ELECTRIC MOTOR COOLING

(71) Applicant: Careen, Inc., New Ulm, MN (US)

(72) Inventor: David Schauer, New Ulm, MN (US)

(73) Assignee: CAREEN, INC., New Ulm, MN (US)

( * ) Notice: Subject to any disclaimer, the term of this patent is extended or adjusted under 35 U.S.C. 154(b) by 246 days.

(21) Appl. No.: 18/609,122

(22) Filed: Mar. 19, 2024

(65) Prior Publication Data

US 2024/0322625 A1 Sep. 26, 2024

Related U.S. Application Data

(60) Provisional application No. 63/491,096, filed on Mar. 20, 2023.

(51) Int. Cl.

| | |
|---|---|
| ***H02K 3/24*** | (2006.01) |
| ***H02K 9/19*** | (2006.01) |
| ***H02K 15/00*** | (2025.01) |
| ***H02K 21/16*** | (2006.01) |

(52) U.S. Cl.

CPC ................. *H02K 3/24* (2013.01); *H02K 9/19* (2013.01); *H02K 15/00* (2013.01); *H02K 21/16* (2013.01)

(58) Field of Classification Search

CPC ............ H02K 3/24; H02K 9/19; H02K 9/197; H02K 15/00; H02K 21/16; H02K 1/20

See application file for complete search history.

(56) References Cited

U.S. PATENT DOCUMENTS 4,562,164 A * 12/1985 Miyazaki ................. H02K 3/30 501/154
5,982,069 A * 11/1999 Rao ........................ H02K 9/197 310/201
11,870,311 B2 * 1/2024 Brown ..................... H02K 1/20
12,062,961 B2 * 8/2024 Diana ...................... H02K 3/24
12,388,310 B2 * 8/2025 Mandel .................... H02K 9/19
2021/0234424 A1 7/2021 Brown
2022/0190664 A1 6/2022 Mandel et al.
2022/0247249 A1 8/2022 Diana et al.

FOREIGN PATENT DOCUMENTS

AU 2011256862 A1 * 11/2012 ............. F01D 25/12
WO WO-2024006157 A1 * 1/2024 ............... H02K 3/44

OTHER PUBLICATIONS

International Searching Authority “International Search Report and Written Opinion” From Application No. PCT/US2024/20487, Mailed Aug. 7, 2024, pp. 13.

* cited by examiner

*Primary Examiner* — Bayan Salone
(74) *Attorney, Agent, or Firm* — Fredrikson & Byron, P.A.

(57) ABSTRACT

An electric motor device includes a rotor assembly inside a housing of the electric motor device, a stator assembly disposed adjacent the rotor assembly and inside the housing of the electric motor device, and a magnet wire assembly at least at the stator assembly inside the housing of the electric motor. The magnet wire assembly defines, at least in part, a cooling channel that extends through at least a portion of the stator assembly of the electric motor device, and the cooling channel is configured to receive therein a cooling fluid that directly contacts the magnet wire assembly to cool the rotor assembly.

8 Claims, 9 Drawing Sheets

ELECTRIC MOTOR COOLING

RELATED APPLICATION

This disclosure claims priority to U.S. provisional patent application No. 63/491,096, filed on Mar. 20, 2023, the entire contents of which are hereby incorporated by reference.

TECHNICAL FIELD

This disclosure generally relates to electric motor cooling. Embodiments are disclosed herein having a magnet wire cooling channel that is configured to convey a cooling fluid through an electric motor to provide a heat transfer function for reducing the temperature of the electric motor. For instance, embodiments are disclosed herein having a cooling channel defined at least in part by a magnet wire that overlays, or is otherwise adjacent and/or interfaces with, an electric motor winding.

BACKGROUND

Electric motors are used in a wide variety of applications, and the prevalence and use cases for electric motors are continually increasing. Many electric motor applications can involve relatively demanding use cases. Such electric motor use cases can result in the electric motor producing relatively significant amounts of heat as a byproduct of the electric motor's mechanical power generation using input electrical power. As such, it can be important to provide a cooling function to the electric motor to facilitate heat transfer away from the electric motor to help maintain the electric motor within a suitable temperature range. Without a cooling function at the electric motor, the electric motor can be susceptible to premature failure. Moreover, a primary consideration for electric motor performance can be how well the electric motor can reject heat and thereby move associated efficiency losses to a cooler point and away from the electric motor.

Conventional means of cooling an electric motor typically include dedicated metallic coolant tubes extending through the electric motor. However, the use of such dedicated metallic coolant tubes to provide a heat transfer function at the electric motor has inherent inefficiencies. For example, the cooling fluid passed through such metallic coolant tubes is insulated from the electric motor components by the metallic coolant tubes themselves and, therefore, the cooling fluid is only able to indirectly cool electric motor components through the thickness of the metallic coolant tubes. This arrangement reduces the efficiency of the heat transfer function provided by the cooling fluid. As another example, the use of such dedicated metallic coolant tubes to convey the cooling fluid adds extra components and weight, thereby increasing the cost and weight of the electric motor. Moreover, incremental added weight at an electric motor can also act to reduce the efficiency associated with the electric motor as incremental generated mechanical power may need to be used to compensate for the added weight at the electric motor. Furthermore, the use of coolant tubes as an integral component within the interior of the electric motor consumes valuable space that typically is utilized for torque production, necessitating either a larger sized motor for the same power rating or a loss of torque production (e.g., because a portion of the available magnetic area within the motor is consumed by the thickness of coolant tubes) if the same size motor is maintained.

SUMMARY

In general, various embodiments relating to a cooling channel defined at least in part by a magnet wire are disclosed herein for electric motor cooling. Embodiments are disclosed herein having a cooling channel that is defined at least in part by a magnet wire that overlays, or is otherwise adjacent and/or interfaces with, an electric motor winding.

Such a magnet wire defined cooling channel can provide a number of useful advantages. For example, because the magnet wire can include an insulating member (e.g., expanded polytetrafluoroethylene (ePTFE)) that is resistant to hydrolysis, the magnet wire itself can directly contact the cooling fluid passed through the cooling channel that is defined at least in part by the magnet wire. Yet, at the same time, this insulating member (e.g., expanded polytetrafluoroethylene (ePTFE)) of the magnet wire can have relatively high thermal conductivity that helps to increase the efficiency of the heat transfer function provided by the cooling fluid passed through the cooling channel that is defined at least in part by the magnet wire. And, in addition, this insulating member (e.g., expanded polytetrafluoroethylene (ePTFE)) of the magnet wire can be suitable for use adjacent to an electric motor winding since this insulating member may not impart noise, interference, or other significant detrimental impact to the magnetic field at the electric motor winding. Thus, use of a magnet wire that includes such an insulating member (e.g., expanded polytetrafluoroethylene (ePTFE)) can optimize a balance between the need for better heat transfer at an electric motor winding without detrimentally impacting the magnetic performance of the electric motor winding due to the magnetic field compatibility of the magnet wire insulating member. Furthermore, in addition to the increased cooling efficiency, this can result in reducing the weight and cost of the electric motor by allowing for elimination of dedicated cooling tube components adjacent the electric motor winding for conveying the cooling fluid. Also, such a magnet wire defined cooling channel, as compared to integrated coolant tubes passing through an electric motor, can increase electric motor efficiency as a result of increased heat rejection efficiency by eliminating the coolant tubes, and their associated material, from the interior of the electric motor and thereby also facilitating space within the electric motor for additional magnetic and torque producing material to help increase the efficiency of the electric motor and/or reduce the weight associated with the electric motor.

One embodiment includes an electromagnetic device. This electromagnetic device includes a magnet wire assembly that defines, at least in part, a cooling channel that extends through at least a portion of the electromagnetic device. The cooling channel is configured to receive and convey a cooling fluid (e.g., a cooling liquid) through the cooling channel, where the cooling channel is configured such that the cooling fluid received and conveyed through the cooling channel directly contacts the magnet wire assembly that defines, at least in part, the cooling channel.

In a further embodiment of this device, the magnet wire assembly can include a conductive wire (e.g., copper wire) and an insulating member overlaying (directly or indirectly) the conductive wire, where the insulating member includes expanded polytetrafluoroethylene (ePTFE). The insulating member, including the ePTFE, can be configured to form at least a portion of an inner diameter of a wall that forms the cooling channel such that the magnet wire assembly is configured for the insulating member, including the ePTFE, to directly contact cooling fluid conveyed through the cooling channel.

In a further embodiment of this device, the cooling channel, defined at least in part by the magnet wire assembly, defines a central longitudinal axis and this central longitudinal axis can be closer to the inside of the electric motor winding than it is to the electric motor's outer housing. For example, the central longitudinal axis of the cooling channel can be closer to a stator magnet than it is to the electric motor's outer housing. As another example, a distance "X" separates an outer diameter of a stator magnet from an inner diameter of the electric motor's outer housing around the electric motor, and the distance between the central longitudinal axis of the cooling channel and the outer diameter of the stator magnet can be 0.1-0.4X while the distance between the central longitudinal axis of the cooling channel and the inner diameter of the motor's outer housing can be 0.6-0.9X. In a further such example, the magnet wire assembly can be included between the cooling channel and the motor's outer housing thereby taking up some (e.g., a majority) of the distance between the central longitudinal axis of the cooling channel and the inner diameter of the motor's outer housing.

In a further embodiment of this device, in addition to the cooling channel being formed by the magnet wire assembly, the cooling channel can also be formed by at least one of one or more rotor magnets and a magnet divider that extends between two stator magnets. As one such example, the cooling channel can be formed by the magnet wire assembly and at least one rotor magnet. In another such example, the cooling channel can be formed by the magnet wire assembly and the magnet divider. And, in yet another such example, the cooling channel can be formed by the magnet wire assembly, at least one rotor magnet, and the magnet divider. In one specific such example, the magnet wire assembly can define approximately 50-90% of a perimeter (e.g., circumference) of a given cooling channel at a given, general longitudinal midpoint along the longitudinal axis of the cooling channel while at least one stator magnet and/or the magnet divider can define the approximately 10-50% of the remaining perimeter (e.g., circumference) of the cooling channel at that same given, general longitudinal midpoint along the longitudinal axis of the cooling channel.

In a further embodiment of this device, the electromagnetic device is configured to operate in an operating environment having a pressure of up to 34 Kpsi and a temperature of up to 260° C.

In a further embodiment of the magnet wire assembly, the insulating member directly overlays and forms a sleeve around the conductive wire.

In a further embodiment of the magnet wire assembly, the insulating member is configured to resist hydrolysis.

In a further embodiment of the magnet wire assembly, the insulating member consists of expanded polytetrafluoroethylene (ePTFE).

In a further embodiment of the magnet wire assembly, the insulating member is configured to operate in an operating environment having a pressure of up to 34 Kpsi and a temperature of up to 260° C.

Another embodiment includes an electric motor device. This electric motor device embodiment includes a rotor assembly inside a housing of the electric motor device, a stator assembly disposed adjacent the rotor assembly and inside the housing of the electric motor device, and a magnet wire assembly at least at the stator assembly inside the housing of the electric motor. The magnet wire assembly defines, at least in part, a cooling channel that extends through at least a portion (e.g., the entire length) of the stator assembly of the electric motor device, and the cooling channel is configured to receive therein a cooling fluid that directly contacts the magnet wire assembly to cool the rotor assembly.

In a further embodiment of this electric motor device, the magnet wire assembly includes a conductive wire and an insulating member overlaying the conductive wire, and the insulating member includes expanded polytetrafluoroethylene (ePTFE). For example, the ePTFE can define, at least in part, the cooling channel that extends through at least a portion of the stator assembly of the electric motor device, and the cooling channel can be configured to receive therein the cooling fluid that directly contacts the ePTFE to cool the rotor assembly. As one such example, the stator assembly can include a magnet divider, and the magnet divider and the magnet wire assembly can define, at least in part, the cooling channel that extends through at least the portion (e.g., the entire length) of the stator assembly of the electric motor device. For instance, the cooling channel can include an outer perimeter, with the magnet divider forming between 1% and 25% of the outer perimeter of the cooling channel and with the ePTFE forming between 75% and 99% of the outer perimeter of the cooling channel.

In a further embodiment of this electric motor device, the magnet wire assembly has a central longitudinal axis extending along a length of the magnet wire assembly. This central longitudinal axis can be closer to a stator magnet at the stator assembly than the central longitudinal axis is to an outermost portion of the housing of the electric motor device.

In a further embodiment of this electric motor device, the cooling channel extends along a cooling channel length through at least the portion of the stator assembly of the electric motor device, and the cooling channel defines a converging fluid pathway, relative to a direction of cooling fluid flow through the cooling channel, through the cooling channel along the cooling channel length. For example, the cooling channel can define a constantly converging fluid pathway along the cooling channel length from a first cooling fluid pathway width at an upstream cooling fluid flow location to a second cooling fluid pathway width at a downstream cooling fluid flow location, where the second cooling fluid pathway width is less than the first cooling fluid pathway width.

In a further embodiment of this electric motor device, the electric motor device further includes a secondary cooling channel that extends through at least a portion of the rotor assembly of the electric motor device. The magnet wire assembly includes a secondary cooling channel inlet that fluidly connects the secondary cooling channel to the cooling channel that is defined, at least in part, by the magnet wire assembly. For example, the stator assembly can further include a magnet divider. The magnet divider and the magnet wire assembly can define, at least in part, the cooling channel that extends through at least the portion of the stator assembly of the electric motor device. The magnet divider can be disposed between the secondary cooling channel and the cooling channel that is defined, at least in part, by the magnet divider and the magnet wire assembly. For instance, this can include, downstream of the secondary cooling channel inlet, the secondary cooling channel being formed at a mechanical air gap adjacent a rotor magnet of the rotor assembly of the electric motor device. In one further example where the electric motor device further includes a bonding agent, such bonding agent can be at the magnet wire assembly inside of the electric motor device to adhere the magnet wire assembly: (i) at a first bonding adherence point to an inner, rotor facing side portion of a slot at the stator assembly, (ii) at a second bonding adherence point to an outer, opposite side portion of the slot at the stator assembly, and (iii) a third bonding adherence point to an adjacent portion of magnet wire assembly that is spaced apart from the cooling channel.

An additional embodiment includes a method for creating one or more coolant fluid pathways at a magnet wire assembly at an electric motor. This method embodiment includes the steps of: placing the magnet wire assembly inside the electric motor, with the magnet wire assembly including a conductive wire and an insulating member overlaying the conductive wire, and the insulating member including expanded polytetrafluoroethylene (ePTFE); after placing the magnet wire assembly inside the electric motor, inserting a tool into contact with the magnet wire assembly inside the electric motor; while the tool is in contact with the magnet wire assembly, actuating the tool to define a coolant fluid pathway at the magnet wire assembly, with the ePTFE defining, at least in part, the coolant fluid pathway at the magnet wire assembly such that when a cooling fluid passes through the coolant fluid pathway the cooling fluid directly contacts the ePTFE; applying a bonding agent to the magnet wire assembly; and after applying the bonding agent to the magnet wire assembly, activating the bonding agent to maintain the coolant fluid pathway through the magnet wire assembly.

In a further embodiment of this method, the tool includes main body and a divider interface projection, with the divider interface projection extending radially outward from the main body and around some but not all of a portion of a perimeter of the main body. And inserting the tool into contact with the magnet wire assembly inside the electric motor includes inserting the main body of the tool into contact with the ePTFE of the magnet wire assembly inside the electric motor and inserting the divider interface projection of the tool into contact with a magnet divider inside the electric motor. As one example, actuating the tool to define the coolant fluid pathway at the magnet wire assembly can include sliding the divider interface projection of the tool along a length of the magnet divider inside the electric motor. In some such embodiments, the tool can have a top end and an opposite bottom end, and a cross-sectional width of each of the main body of the tool and the divider interface projection of the tool can taper along a length of the tool from the top end of the tool to the bottom end of the tool.

In a further embodiment of this method, the bonding agent can be applied at exposed surfaces of the magnet wire assembly inside the electric motor after the tool has been placed into contact with the magnet wire assembly. For instance, the bonding agent can be applied at exposed surfaces of the magnet wire assembly inside the electric motor while the tool occupies at least an open end portion of the coolant fluid pathway such that tool at least partially shields the coolant fluid pathway from receiving the applied bonding agent. In one such example, activating the bonding agent to maintain the coolant fluid pathway through the magnet wire assembly includes adhering the magnet wire assembly, via the bonding agent: (i) at a first bonding adherence point to an inner, rotor facing side portion of a slot at a stator assembly of the electric motor, (ii) at a second bonding adherence point to an outer, opposite side portion of the slot at the stator assembly, and (iii) a third bonding adherence point to an adjacent portion of magnet wire assembly that is spaced apart from the cooling channel. In some such embodiments, the bonding agent can be applied at substantially all exposed surfaces of the magnet wire assembly within the electric motor such that the bonding agent accumulates at, and over, such exposed surfaces of the magnet wire assembly.

In a further embodiment of this method, the method also includes a step of: creating a secondary cooling channel, spaced apart from the coolant fluid pathway at the magnet wire assembly, through a rotor assembly of the electric motor by providing a secondary cooling channel inlet at the magnet wire assembly in fluid communication with the secondary cooling channel at the rotor assembly. In some such embodiments, the secondary cooling channel can be created by leveraging the magnet wire assembly to input cooling fluid at the mechanical air gap between the rotor assembly and the stator assembly such that this mechanical air gap between the rotor assembly and the stator assembly can serve as such secondary cooling channel that received coolant fluid from the magnet wire assembly formed cooling channel that extends through the stator assembly.

The details of one or more examples are set forth in the accompanying drawings and the description below. Other features, objects, and advantages will be apparent from the description and drawings.

BRIEF DESCRIPTION OF THE DRAWINGS

The following drawings are illustrative of particular embodiments of the present invention and therefore do not limit the scope of the invention. The drawings are intended for use in conjunction with the explanations in the following description. Embodiments of the invention will hereinafter be described in conjunction with the appended drawings, wherein like numerals denote like elements. The drawings are not necessarily to scale, though certain embodiments can include one or more components at the scale shown.

FIG. 2 shows a stator component, a rotor component, and the magnet wire assembly of the electric motor device of FIG. 1. FIG. 2 is a cross-section of the electric motor of FIG. 1 take along a plane that is transverse to the plane along which the cross-section of FIG. 1 is taken (e.g., FIG. 1 is a longitudinal cross-section while FIG. 2 is a transverse cross-section of the electric motor).

FIG. 4 illustrates both primary cooling channels defined by the magnet wire assembly through the stator assembly and secondary cooling channels at the mechanical air gap between the rotor assembly and the stator assembly.

FIG. 8A is a bottom plan view of a prong main body and a prong divider interface projection of the tool, FIG. 8B is an elevational view of the prong main body and the prong divider interface projection of the tool, and FIG. 8C is a bottom side perspective view of the tool showing a plurality of prongs at the tool.

DETAILED DESCRIPTION

The following detailed description is exemplary in nature and is not intended to limit the scope, applicability, or configuration of the invention in any way. Rather, the following description provides some practical illustrations for implementing embodiments of the present invention. Examples of constructions, materials, and/or dimensions are provided for selected elements. Those skilled in the art will recognize that many of the noted examples have a variety of suitable alternatives.

Figure 1:
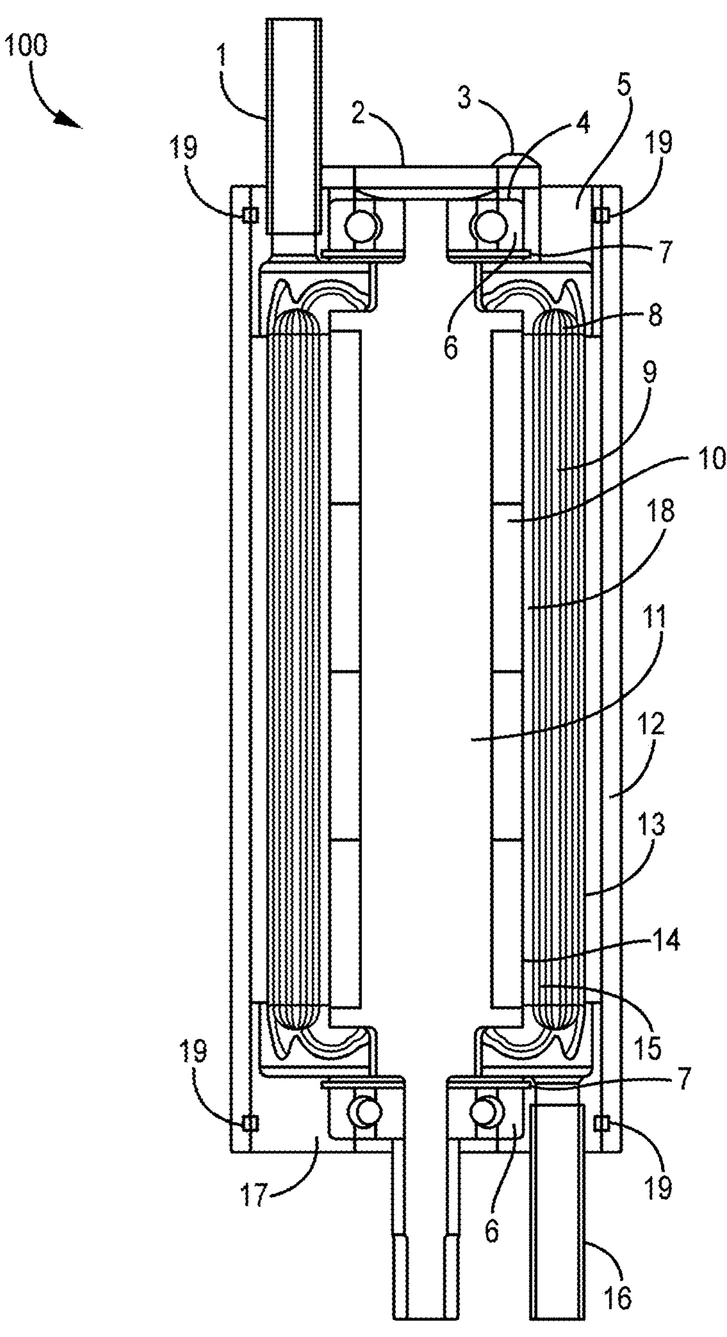
FIG. 1 is a longitudinal cross-sectional view of an embodiment of an electric motor device showing internal components, including a magnet wire assembly that defines a cooling channel, with the cross-section taken along a central longitudinal axis of the electric motor device.
Figure 2:
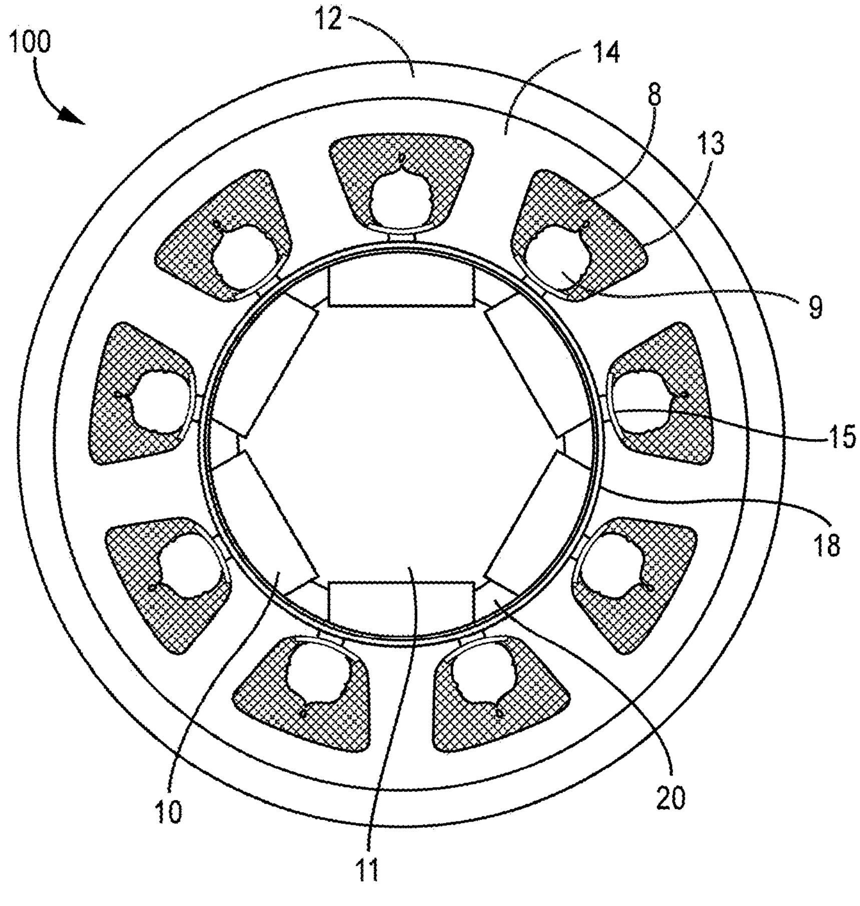
FIG. 2 is an end plan view of the electric motor device of FIG. 1.

FIGS. 1 and 2 illustrate an exemplary embodiment of an electric motor device 100. FIG. 1 shows a cross-sectional view of the electric motor device 100 taken along a central longitudinal axis of the electric motor device 100, and FIG. 2 shows an end plan view of the electric motor device 100. FIGS. 1 and 2 illustrate components of the electric motor device 100, including a magnet wire assembly 8 that defines a cooling channel 9 extending within the electric motor device 100.

The electric motor 100 can include a rotor shaft 11 that interfaces with a stator component (sometimes referred to as a "stator stack") 14. The rotor shaft 11 can include one or more magnets. As the rotor shaft 11 is moved relative to the stator component 14 during operation of the electric motor 100, the magnets carried by the rotor shaft 11 can be moved relative to the one or more magnets 10 at the stator component 14. This relative movement during operation of the electric motor 100 can produce a magnetic field which the electric motor 100 can use create electric power.

During such operation of the electric motor 100, heat can be generated as a byproduct of this electric power generation. It can be important to maintain the electric motor within an operational temperature range so as to prevent overheating of the electric motor device 100, which can cause premature failure of the electric motor device 100. Accordingly, the electric motor device 100 can include one or more cooling channels 9 (e.g., a plurality of cooling channels 9 as shown for the illustrated embodiment) for conveying a cooling fluid (e.g., water, salt water, glycol, water ethaline glycol ("WEG"), etc.) to provide a heat transfer function at the electric motor device 100 as to help carry heat away from the electric motor device 100 (e.g., away from the stator component 14) and thereby decrease a temperature at the electric motor device 100. For example, as disclosed herein, embodiments can have a cooling channel defined at least in part by a magnet wire that overlays, or is otherwise adjacent and/or interfaces with, an electric motor winding. In a particular such example, one such electric motor embodiment can further include water ethaline glycol ("WEG") either on-board the electric motor or otherwise incorporated into the electric motor's specific application, and a cooling loop that includes the cooling channel defined at least in part by the noted magnet wire can also include a power inverter component at the electric motor.

To provide a fluid pathway for the cooling fluid, the electric motor device 100 can have a cooling fluid inlet 1 and a cooling fluid outlet 16. As shown for the illustrated embodiment of the electric motor device 100, the cooling fluid inlet 1 and the cooling fluid outlet 16 can be at opposite longitudinal ends of the electric motor device 100 such that the cooling fluid pathway can extend through the electric motor device 100 from one end to another, opposite end of the electric motor device 100. In particular, the cooling fluid inlet 1 can extend through a spring retention cap 2 and be in fluid communication with a first end of the one or more of the cooling channels 9, while the cooling fluid outlet 16 can extend through an end cap 17 and be in fluid communication with a second, opposite end of the one or more cooling channels 9.

The electric motor device 100 shown at FIGS. 1 and 2 can include additional components. For instance, at the same end portion as the cooling fluid inlet 1, the spring retention cap 2 can include a cap fixation member (e.g., screw) 3 and a retention spring 4. The button cap fixation member 3 and the retention spring 4 can together be configured to both secure the spring retention cap 2 in place relative to and at a motor housing 12 of the electric motor device 100 and allow for selective removal of the spring retention cap 2 to facilitate access to the interior of the electric motor device 100. For instance, the electric motor device 100 can include a retention cap receiving element 5, and the spring retention cap 2 can be removably coupled in place (e.g., via the cap fixation member 3) at the retention cap receiving element 5 that is defined at the motor housing 12. Also at the same end portion as the cooling fluid inlet 1, the electric motor device 100 can include two or more bearings 6 that receive and can be disposed to interface with an end portion of the rotor shaft 11. These bearings 6 can serve as a rotational coupling interface or the rotating end portion of the rotor shaft 11. A bearing seal 7 can be included adjacent the bearings 6 so as to help seal fluid around the bearings 6 and help to prevent fluid from the bearings 6 egressing out from the electric motor device 100. The bearing seal 7 as shown for the illustrated embodiment can be disposed adjacent to bearing 6 that rotatably supports the rotor assembly (e.g., rotatably supports the rotor assembly that comprises the magnets 10, rotor shaft 11, and magnet divider 20), for instance the bearing seal 7 as shown for the illustrated embodiment can be disposed adjacent to bearing 6 that rotatably supports the rotor shaft 11. In some embodiments, such as that illustrated here, the electric motor device 100 can include one or more motor housing seals 19 (e.g., in addition to the bearing seal 7) interfacing with the magnet wire assembly 8 at any one or more locations along a length of the magnet wire assembly 8 as it extends through the electric motor device 100. For example, motor housing seals 19 can be disposed between interfacing housing components of the electric motor device 100 and configured to help prevent or reduce fluid from leaking from inside the electric motor device 100 to outside the electric motor device 100. The electric motor device 100 can also include a slot liner 13 disposed between the magnet wire assembly 8 and the motor housing 12 and/or a wedge 15 disposed to close any gap between magnets 10. Though in certain embodiments the slot liner 13 and/or wedge 15 may be omitted. And, as seen at FIG. 2, the electric motor device 100 can include a magnet divider 20 between the magnets 10 of the stator component 14. Thus, moving circumferentially around a general perimeter of the stator component 14, the magnets 10 and magnet divider 20 alternate as an interfacing component with an air gap 18.

Figure 3:
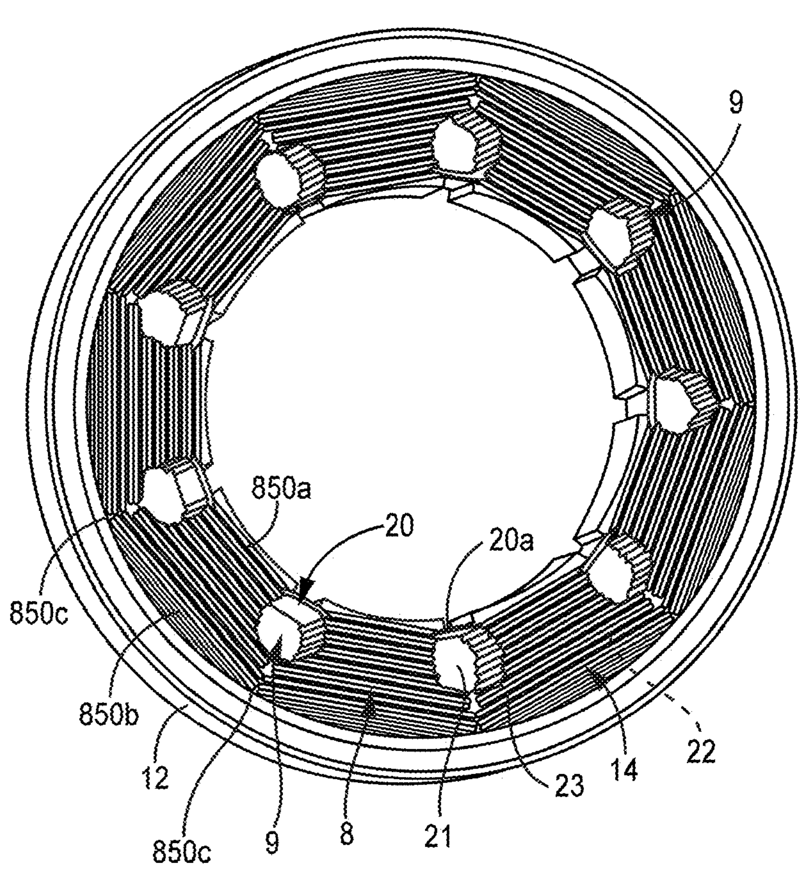
FIG. 3 is a perspective view of a stator component magnet arrangement and the magnet wire assembly that defines cooling channels of the electric motor device of FIG. 1.

FIG. 3 illustrates an exemplary embodiment of the stator component 14 and the magnet wire assembly 8. The magnet wire assembly 8 defines, at least in part, one or more cooling channels 9 of the electric motor device 100. For example, as shown for the illustrated embodiment at FIG. 3, the magnet wire assembly 8 defines, at least in part, a plurality of the cooling channels 9 of the electric motor device 100 spaced circumferentially around a perimeter of the stator component 14. While the illustrated embodiment shows nine cooling channels 9, other embodiments within the scope of the present disclosure can include numbers of such cooling channels 9, for instance any number of two or more cooling channels 9.

As noted, the magnet wire assembly 8 can define, at least in part, each of the cooling channels 9 of the electric motor device 100. More specifically, for the illustrated embodiment, at least a portion of a perimeter (e.g., circumference) of each of the cooling channels 9 can be defined by the magnet wire assembly 8. For instance, depending on the specific embodiment, the magnet wire assembly 8 can define at least 50%, at least 60%, at least 75%, at least 80%, or at least 90% of a perimeter (e.g., circumference) of a given cooling channel 9 at a given, general longitudinal midpoint along a longitudinal axis of the given cooling channel 9. For the illustrated embodiment, the magnet wire assembly 8 can define a first portion of a perimeter (e.g., circumference) of a given cooling channel 9 at a given, general longitudinal midpoint along a longitudinal axis of the given cooling channel 9 while one or both of the one or more magnets 10 (shown, e.g., in FIG. 2) and the magnet divider 20 can form a second, remaining portion of the perimeter (e.g., circumference) of the given cooling channel 9 at that same given, general longitudinal midpoint along the longitudinal axis of that cooling channel 9. As one specific such example, the magnet wire assembly 8 can define approximately 50-90% of a perimeter (e.g., circumference) of a given cooling channel 9 at a given, general longitudinal midpoint along a longitudinal axis of the given cooling channel 9 while one or more magnets 10 (shown, e.g., in FIG. 2) and/or the magnet divider 20 can form approximately 10-50% of the perimeter (e.g., circumference) of the given cooling channel 9 at that same given, general longitudinal midpoint along the longitudinal axis of that cooling channel 9. As a yet more specific such example, the magnet wire assembly 8 can define approximately 50-90% of a perimeter (e.g., circumference) of a given cooling channel 9 at a given, general longitudinal midpoint along a longitudinal axis of the given cooling channel 9 while the magnet divider 20 can form approximately 10-50% of the perimeter (e.g., circumference) of the given cooling channel 9 at that same given, general longitudinal midpoint along the longitudinal axis of that cooling channel 9.

For instance, in some embodiments, the magnet wire assembly 8 can be placed at the slot 13 and the one or more cooling channels 9 can be defined at the magnet wire assembly 8 at the slot 13. For example, where the slot 13 has a given cross-sectional diameter X, the magnet wire assembly 8 can occupy 0.5X or more of the given cross-sectional diameter X of the slot 13 and the one or more cooling channels 9 can occupy 0.5X or less of the given cross-sectional diameter X of the slot 13. In a further such example, the magnet wire assembly 8 can occupy 0.7X or more of the given cross-sectional diameter X of the slot 13 and the one or more cooling channels 9 can occupy 0.3X or less of the given cross-sectional diameter X of the slot 13. The inventor has discovered that such relative cross-sectional area ratios of the cross-sectional area occupied by the magnet wire assembly 8 material and the cross-sectional area occupied by the cooling channel 9 (e.g., occupied by a void, the absence of the magnet wire assembly or other material) can be useful in balancing and optimizing electric motor performance specifications with cost efficiency by addressing what can be competing interests of coolant fluid flow rate and coolant fluid pressure through the one or more cooling channels 9.

The cooling channels 9 can be formed within the electric motor device's stack assembly. The location of the cooling channels 9 relative to the electric motor winding can impact the performance of the heat transfer function provided by the cooling channels 9 since the hottest portion of the electric motor assembly will typically be the electric motor winding (e.g., at the magnetic rotor portion interior of the stator portion). In particular, the closer a given cooling channel 9 is to the inside of the electric motor winding, the better the cooling performance provided by the cooling fluid conveyed through that cooling channel 9. Accordingly, to improve the cooling performance, each of the cooling channels 9 can have a central longitudinal axis 21 extending longitudinally and centrally through the respective cooling channel 9, and this central longitudinal axis 21 can be closer to the magnets 10 (e.g., closer to the inside of the electric motor winding) than to the motor housing 12. For example, if a distance "X" separates an outer diameter of the magnets 10 from an inner diameter of the motor housing 12 around the motor, the distance between the central longitudinal axis 21 of a given cooling channel 9 and the outer diameter of an adjacent magnet 10 can be 0.1-0.4X while the distance between the central longitudinal axis 21 of a given cooling channel 9 and the inner diameter of the motor housing 12 can be 0.6-0.9X. In fact, as shown for the illustrated embodiment, the magnet wire assembly 8 can be included between a given such cooling channel 9 and the motor housing 12 thereby taking up some (e.g., a majority) of the distance between the central longitudinal axis 21 of a given cooling channel 9 and the inner diameter of the motor housing 12.

Thus, the electric motor device 100 can use the magnet wire assembly 8 to provide one or more cooling channels 9 extending within and through at least a portion of the electric motor device 100. Accordingly, this electric motor device 100 can eliminate the conventional dedicated cooling tube components used in electric motors by instead using the magnet wire assembly 8 to convey cooling fluid within the electric motor device 100. In this way, cooling fluid, conveyed through each of the one or more cooling channels 9, can directly contact the magnet wire assembly 8 (e.g., cooling fluid can directly contact an outer insulating member of the magnet wire assembly 8) as this cooling fluid passes through each of the one or more cooling channels 9. And, likewise given the elimination of conventional dedicated cooling tube components, in embodiments of the electric motor device 100 where the magnet wire assembly 8 forms some but not all of the cooling channel's perimeter and the one or more magnets 10 and/or the magnet divider 20 form the other portion of the cooling channel's perimeter, cooling fluid, conveyed through the cooling channel 9, can directly contact both the magnet wire assembly 8 and the one or more magnets 10 and/or the magnet divider 20 forming the other, remaining portion of the cooling channel's perimeter.

The magnet wire assembly 8 can include a conductive wire 22 and an insulating member 23 overlaying (directly or indirectly) the conductive wire 22, where the insulating member 23 includes expanded polytetrafluoroethylene (ePTFE). Expanded polytetrafluoroethylene (ePTFE) has a microstructure defined by fibrils (e.g., thread-like elements) and nodes (e.g., particles from which fibrils emerge). ePTFE is described in detail in U.S. Pat. No. 5,374,473. ePTFE, when applied to the outer diameter of a solid conductive (e.g., copper) wire 22 acts as an insulator which can be used as a magnet wire in the electric motor device 100 while enabling enhanced performance qualities optimized for operation in high pressure, high temperature and in operating environments subject to hydrolysis. The inventor has discovered that, under these relatively harsh conditions, the performance qualities of ePTFE can enable the electric motor device 100 to simultaneously withstand the effects of combined high temperature and high pressure while also resisting hydrolysis and serving to convey cooling fluid to provide a heat transfer function at the electric motor device 100. The use of ePTFE as a dielectric and thermal insulator has not previously been employed as a magnet wire for use in an electric motor. Other types of non-expanded polymer insulation are available but the structure of the improved electric motor incorporates the magnet wire using the unique and expanded version of an engineered fluoropolymer (ePTFE). Consideration for using an expanded fluoropolymer, such as ePTFE, as an insulator on a magnet wire in an electric motor is unique because it is not an extruded or drawn product, which is the typical type of material looked to for traditional magnet wires. Use of an expanded polymer, such as ePTFE, as magnet wire forming, at least in part, a cooling channel in an electric motor is a first of its kind utilizing the insulation also as a means to improve the electric motor's cooling function for purposes of extending motor life and cooling efficiency while also reducing components and weight of the electric motor (e.g., due to eliminating integrated cooling tubes from within the electric motor resulting in few parts and less complexity). Expanded polymer material, such as ePTFE, has not been available in the form of magnet wire insulation or considered use for use in improving electric motor cooling operation.

Thus, the electric motor device 100 can include the magnet wire assembly 8 that includes a conductive wire (e.g., copper wire) 22 and the insulating member 23 that can overlay (directly or indirectly) the conductive wire 22, and the insulating member 23 can include expanded polytetrafluoroethylene (ePTFE). The ePTFE included at the insulating member 23 of the magnet wire assembly 8 can have an engineered composition to manipulate this material's structure, shape, thickness, and surface geometry paired with complementary materials to provide dielectric, thermal, and chemical performance characteristics tuned or optimized for a magnet wire assembly applied in an electromagnetic device (e.g., electric motor device 100).

Figure 4:
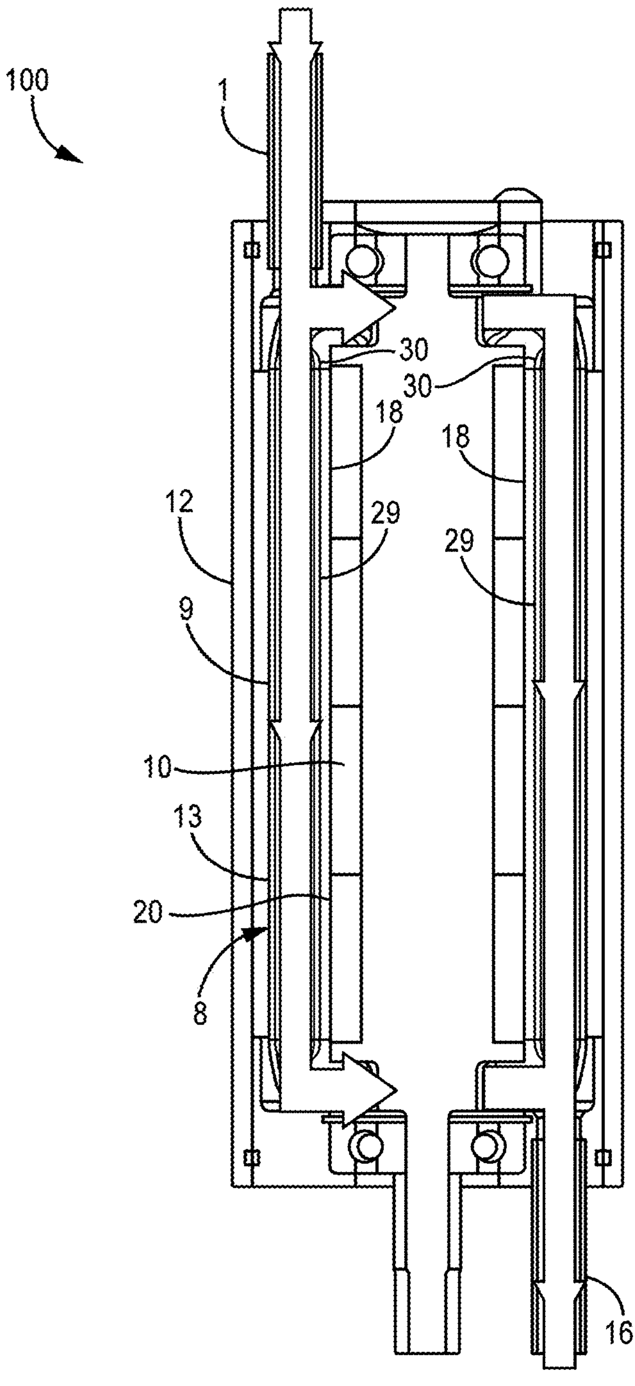
FIG. 4 is a longitudinal cross-sectional view of the electric motor device of FIG. 1 showing coolant fluid pathways through cooling channels defined by the magnet wire assembly, with the cross-section taken along the central longitudinal axis of the electric motor device as with FIG. 1.

FIG. 4 illustrates the cross-sectional view of the electric motor device 100 as shown at FIG. 1 and additionally including one or more flow path annotations to show one or more cooling fluid pathway(s) through cooling channels 9 that are defined, at least in part, by the magnet wire assembly 8 and extend through the electric motor device 100.

As seen at FIG. 4, cooling fluid can be input at the cooling fluid inlet 1 and pass to one or more (e.g., each) of the cooling channels 9. This cooling fluid can then travel through the length of each such cooling channel 9. While the cooling fluid passes through each cooling channel 9, the cooling fluid can directly contact the magnet wire assembly 8 that defines, at least in part, each cooling channel 9. For embodiments where the one or more magnets 10 and/or the magnet divider 20 form a remaining portion of the perimeter (e.g., circumference) of a given cooling channel 9, while the cooling fluid passes through a length of that given cooling channel 9 the cooling fluid can directly contact the magnet wire assembly 8 and the one or more magnets 10 and/or the magnet divider 20 that together define that cooling channel 9 along at least some, or all, of the length of that cooling channel 9. The cooling fluid can then pass from an end of each cooling channel to the cooling fluid outlet 16 where the cooling fluid can be output from the electric motor device 100.

In some embodiments, such as that illustrated here, the magnet wire assembly 8 can form one or more primary cooling channels 9 while the air gap 18 can form one or more secondary cooling channels 29. The air gap 18 can, for example, be defined between the rotor assembly and the stator assembly of the electric motor device 100. For instance, the air gap 18, and thus the one or more secondary cooling channels 9, can be at an interior side of the magnet divider 20 while the one or more primary cooling channels 9 can be at an opposite, exterior side of the magnet divider 20. In certain embodiments, cooling fluid can be introduced into the electric motor device 100 at the cooling fluid inlet 1 and into the one or more primary cooling channels 9. This introduced cooling fluid can then pass through a portion of the one or more primary cooling channels 9 and then from such portion of the one or more primary cooling channels 9 into the one or more secondary cooling channels 29 at the air gap 18. As such, the one or more primary cooling channels 9 can define a secondary cooling channel inlet 30 that fluidly connects the one or more primary cooling channels 9 with the secondary cooling channel inlet 30 (e.g., the one or more primary cooling channels 9 can define a secondary cooling channel inlet 30 that fluidly connects the one or more primary cooling channels 9 with the air gap 18). Thus, in such embodiments, cooling fluid can be introduced into the electric motor device 100 at the cooling fluid inlet 1 and into the one or more primary cooling channels 9. Then a first portion of this introduced cooling fluid can bypass the secondary cooling channel inlet 30 at the one or more primary cooling channels 9 and be directed through the one or more primary cooling channels 9 and to the cooling fluid outlet 16, while a second, different portion of this introduced cooling fluid can exit the one or more primary cooling channels 9 at the secondary cooling channel inlet(s) 30 and be directed to the secondary cooling channels 29 at the air gap 18 and to the rotor assembly and exit at the cooling fluid outlet 16. In some applications, the one or more primary cooling channels 9, defined at least in part by the magnet wire assembly 8, can be configured to receive a greater volume of cooling fluid than the one or more secondary cooling channels 29 (e.g., because the cross-sectional diameter of the one or more primary cooling channels 9 can be larger than the cross-sectional diameter of the air gap 18).

As noted, the one or more secondary cooling channels 29 can be configured to deliver a cooling fluid to the rotor assembly (e.g., to deliver cooling fluid adjacent to or at the rotor shaft 11 and/or magnets 10) and thereby the one or more secondary cooling channels 29 can be configured to provide a thermal cooling function at the rotor assembly. For instance, the one or more secondary cooling channels 29 can be configured to direct cooling fluid into direct contact with the rotor assembly (e.g., into direct contact with the rotor shaft 11 and/or magnets 10). Thus, the one or more primary cooling channels 9 can be configured to provide an indirect thermal cooling function to the rotor assembly by directing cooling fluid through the magnet wire assembly 8 that forms, at least in part, the one or more primary cooling channels 9 to indirectly cool the rotor assembly while the one or more secondary cooling channels 29 can be configured to provide a direct thermal cooling function to the rotor assembly by directing cooling fluid through the one or more secondary cooling channels 29 and into direct contact with the rotor assembly. Thus, cooling fluid passing through the one or more secondary cooling channels 29 can be directed to the rotor assembly while cooling fluid passing through the one or more primary cooling channels 9 can be directed to the stator assembly. For instance, cooling fluid passing through the one or more primary cooling channels 9 can pass through, at least partially, the magnet wire assembly 8 at one side of the magnet divider 20 while cooling fluid passing through the one or more secondary cooling channels 29 can pass through, at least partially, the air gap 18 at another, opposite side of the magnet divider 20. As such, the magnet divider 20, magnet wire assembly 8, and/or magnets 10 can be configured to separate the one or more primary cooling channels 9 from the one or more secondary cooling channels 29 at longitudinal locations along the length of the cooling channels.

Figure 5:
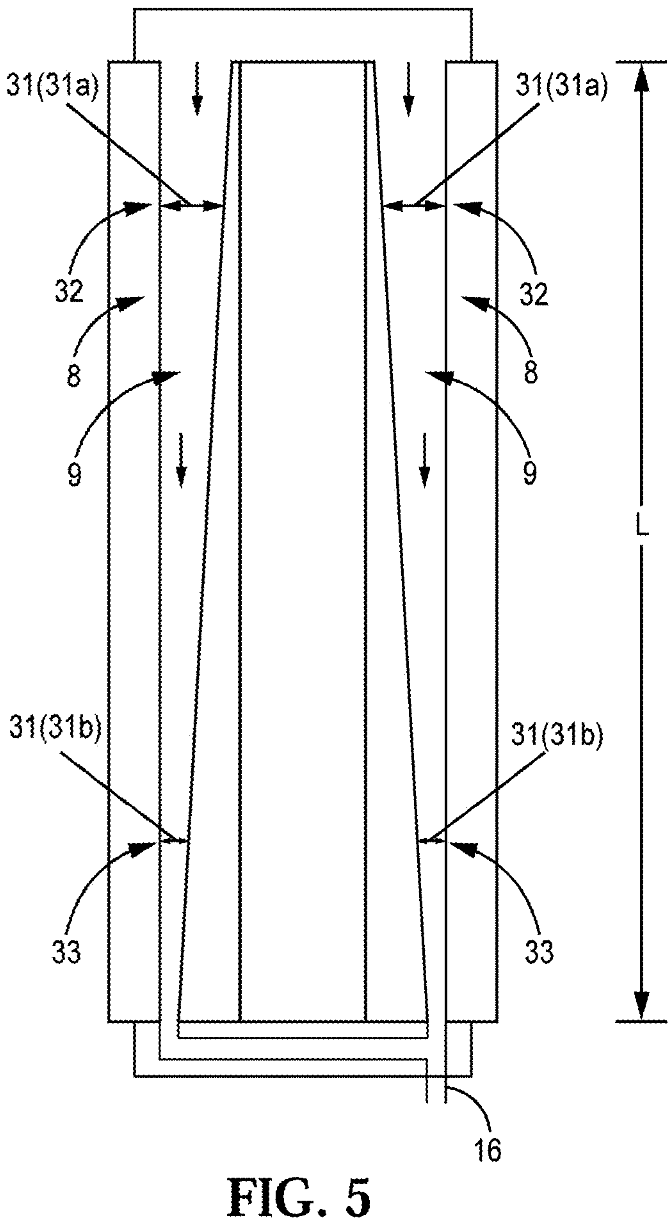
FIG. 5 is schematic diagram of a longitudinal cross-sectional view of an exemplary geometry of a coolant fluid pathway (e.g., primary cooling channel) defined, at least in part, by the magnet wire assembly, with the cross-section taken along the central longitudinal axis of the electric motor device as with FIG. 1.

FIG. 5 is schematic diagram of a longitudinal cross-sectional view of an exemplary geometry of coolant fluid pathway 9 defined, at least in part, by the magnet wire assembly 8, with the cross-section shown at FIG. 5 taken along the central longitudinal axis of the electric motor device 100 as with FIG. 1.

As shown at the embodiment seen at FIG. 5, the coolant fluid pathways 9 can include a converging cross-sectional geometry along at least a portion of a length L. For example, the one or more coolant fluid pathways 9 can define a coolant fluid pathway width 31 along the length L of the one or more coolant fluid pathways 9. The one or more coolant fluid pathways 9 can include the converging cross-sectional geometry along at least a portion of a length L by defining a converging coolant fluid pathway width 31 along at least a portion of a length L converging in direction of the coolant fluid flow through the coolant fluid pathway 9.

For instance, as shown for the illustrated embodiment, the magnet wire assembly 8 can define a first cooling fluid pathway width 31*a* at a first, upstream location 32 along the length of the coolant fluid pathway 9, and the magnet wire assembly 8 can define a second, different cooling fluid pathway width 31*b* at a second, different more downstream location 33 along the length of the coolant fluid pathway 9. In various embodiments, the fluid coolant pathway 9 can define its largest cross-section width/diameter 31 at or near the fluid inlet and its smallest cross-sectional width/diameter 31 at or near the fluid outlet 16. The second location 33 can be closer to the fluid outlet 16 than the first location 32, and the second cooling fluid pathway width 31*b* can be less than the first cooling fluid pathway width 31*a*. The coolant fluid can pass in a direction from the first location 32 to the second location 33, and the distance between the first location and the second location (e.g., the length L along which a continuous convergence is present at the coolant fluid pathway 9) can be at least two inches, at least three inches, at least six inches, at least twelve inches, or at least eighteen inches. In some such embodiments, the cooling fluid pathway 9 can define a continuously converging cross-sectional geometry along at least a portion of the length L. Referring to the example shown at the illustrated embodiment here, the cooling fluid pathway 9 can converge continuously (e.g., taper continuously in diameter) along the length L from the first cooling fluid pathway width 31*a* to the second cooling fluid pathway width 31*b*. Thus, as the cooling fluid passes through the magnet wire assembly 8 and thus through the cooling fluid pathway 9 in a direction from the fluid inlet 1 toward the fluid outlet 16, the cooling fluid can pass through a continuously narrowing internal diameter defined, at least in part, by the magnet wire assembly 8. In some embodiments, the coolant fluid pathway 9 can have the convergent (e.g., constantly converging) cross-sectional geometry along an entire linear length L of the coolant fluid pathway 9, such as shown for the illustrative example here. In some embodiments, the coolant fluid pathway 9 can include the convergent cross-sectional geometry within one inch, three inches, six inches, twelve inches, or eighteen inches of the cooling fluid outlet 16. In some embodiments, some coolant fluid pathways 9 at the electric motor device 100 can define such a convergent cross-sectional geometry while one or more other coolant fluid pathways 9 at the electric motor device 100 can lack such a convergent cross-sectional geometry.

Passing the coolant fluid through a convergent geometry coolant fluid pathway 9 can be useful in increasing the efficiency of a thermal transfer function provided by passing the coolant fluid through the convergent geometry coolant fluid pathway 9. For example, the convergent geometry coolant fluid pathway 9 can be configured to create a pressure delta (e.g., in addition to that created by the pressure of the coolant fluid) across the convergent geometry of the coolant fluid pathway 9. And, thus, the convergent geometry coolant fluid pathway 9 can be configured to increase the pressure of the coolant fluid passing through the coolant fluid pathway 9 and thereby help to increase the heat transfer efficiency of the coolant fluid passing through the coolant fluid pathway 9. For example, the convergent geometry coolant fluid pathway 9 in addition to the input temperature and input flow rate associated with the coolant fluid can be factors that influence the heat transfer efficiency of the coolant fluid passing through the coolant fluid pathway 9.

Figure 6:
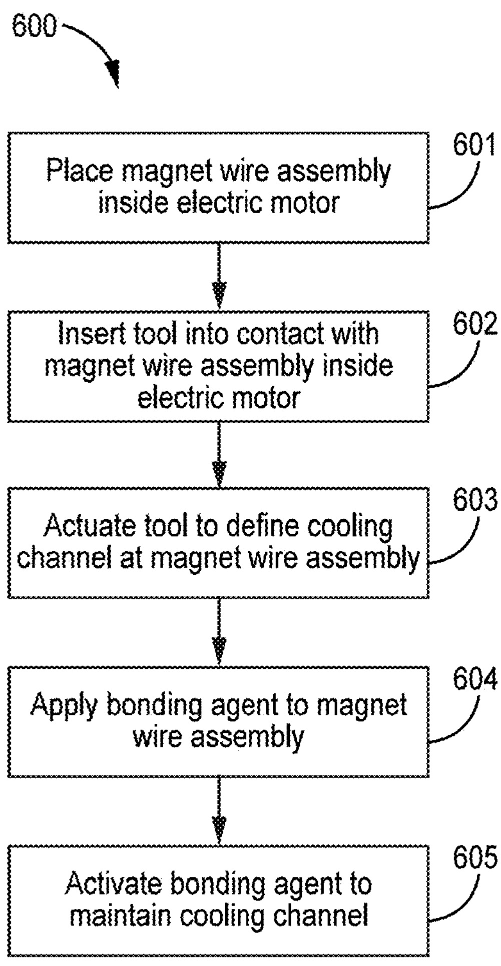
FIG. 6 is a flow diagram of an embodiment of a method of creating one or more electric motor coolant fluid pathways at a magnet wire assembly.

FIG. 6 is a flow diagram of an embodiment of a method 600 for creating one or more electric motor coolant fluid pathways at a magnet wire assembly. The method 600 can, for example, be executed using any one or more of the aspects disclosed elsewhere herein.

At step 601, the method 600 includes placing a magnet wire assembly inside an electric motor. In some applications, the magnet wire assembly placed inside the electric motor can be similar to, or the same as, the magnet wire assembly disclosed elsewhere herein. In one exemplary such application, the magnet wire placed inside the electric motor at step 601 can be a magnet wire assembly that includes a conductive wire and an insulating member, which includes expanded polytetrafluoroethylene (ePTFE), overlaying (directly or indirectly) the conductive wire.

Figure 7:
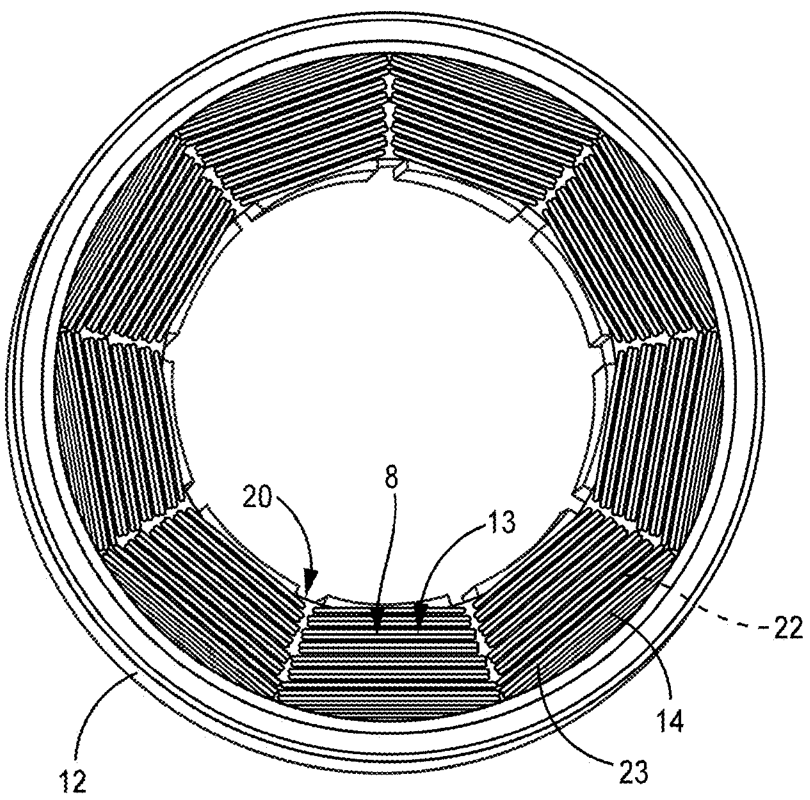
FIG. 7 is a perspective view of a magnet wire assembly initially placed at an electric motor prior to creating one or more coolant fluid pathways at the magnet wire assembly.

In some embodiments, placing the magnet wire assembly inside an electric motor at step 601 can include placing the magnet wire assembly in a concentrated winding pattern inside the electric motor. For example, the magnet wire assembly can be placed in a concentrated winding pattern inside the electric motor by winding the magnet wire assembly over one tooth at the inside of the electric motor. As one such example, FIG. 7 illustrates a perspective view of a magnet wire assembly 8 as initially placed inside the electric motor in a concentrated winding pattern at step 601 and prior to creating one or more coolant fluid pathways at the magnet wire assembly 8. As shown here at the example of FIG. 7, the magnet wire assembly 8 is placed inside the electric motor in a concentrated winding pattern by wrapping the magnet wire assembly 8 around a common tooth inside the electric motor (e.g., by wrapping the magnet wire assembly 8 around a common tooth at the slot 13 inside the electric motor). Thus, at step 601, the magnet wire assembly 8 can be placed at the stator assembly (e.g., at the slot 13) inside the electric motor in a concentrated winding pattern. The inventor has discovered that placing the magnet wire assembly inside the electric motor in a concentrated winding pattern can facilitate more efficient and precise formation of cooling fluid pathways at the concentrated winding magnet wire assembly placed inside the electric motor.

At step 602, after placing the magnet wire assembly inside the electric motor, the method 600 includes inserting a tool into contact with the magnet wire assembly inside the electric motor. For example, where the magnet wire assembly is placed at the stator assembly (e.g., at the slot 13) inside the electric motor in a concentrated winding pattern, step 602 can include inserting the tool into contact with the concentrated winding pattern of the magnet wire assembly inside the electric motor. The tool can be inserted into contact with the concentrated winding pattern of the magnet wire assembly inside the electric motor at step 602 prior to the concentrated winding pattern of the magnet wire assembly having a coolant fluid pathway defined therethrough. As one specific such example, the tool can include a main body and a divider interface projection that extends outward from the main body and defines a magnet divider interface surface. Inserting the tool into contact with the magnet wire assembly inside the electric motor can include contacting the magnet wire assembly inside the electric motor with the main body of the tool and contacting the magnet divider inside the electric motor at least with the magnet divider interface surface at the divider interface projection of the tool. As such, in some implementations of the method 600, at step 602 the tool can be rotated relative to the magnet wire assembly inside the electric motor to align for interfacing the magnet divider interface surface at the divider interface projection of the tool and the magnet divider. As noted, this can include contacting the concentrated winding pattern magnet wire assembly inside the electric motor with the main body of the tool and contacting the magnet divider inside the electric motor at least with the magnet divider interface surface at the divider interface projection of the tool.

Once the tool is inserted into contact with the magnet wire assembly inside the electric motor, at step 603 the method 600 can include actuating the tool to define a coolant fluid channel pathway at the magnet wire assembly. For example, once the tool is inserted into the electric motor at step 602 such that the magnet divider interface surface at the divider interface projection of the tool interfaces with the magnet divider inside the electric motor and the main body of the tool is in contact with the concentrated winding pattern magnet wire assembly inside the electric motor, an actuation force can be applied at the tool to cause (i) the magnet divider interface surface to move relative to the magnet divider inside the electric motor and (ii) the main body to move relative to the magnet wire assembly to create a coolant fluid channel pathway defined at last by the magnet divider and the magnet wire assembly inside the electric motor. In some embodiments, the method 600 can additionally include creating one or more secondary coolant fluid channel pathways inside the electric motor in fluid communication with the primary coolant fluid channel pathway created at step 603 before or after step 603.

Figure 8A:
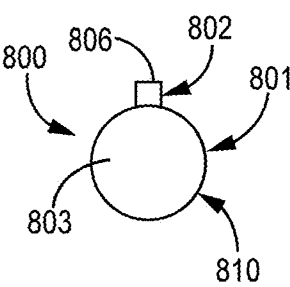
FIGS. 8A-8C show an embodiment of a tool configured to help create a coolant fluid pathway at a magnet wire assembly (e.g., such as at the magnet wire assembly placed at the electric motor of FIG. 7). Specifically.
Figure 8B:
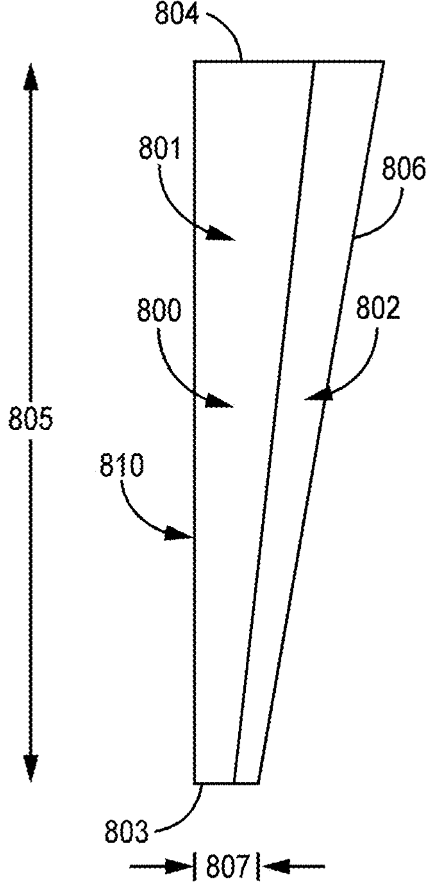
Figure 8C:
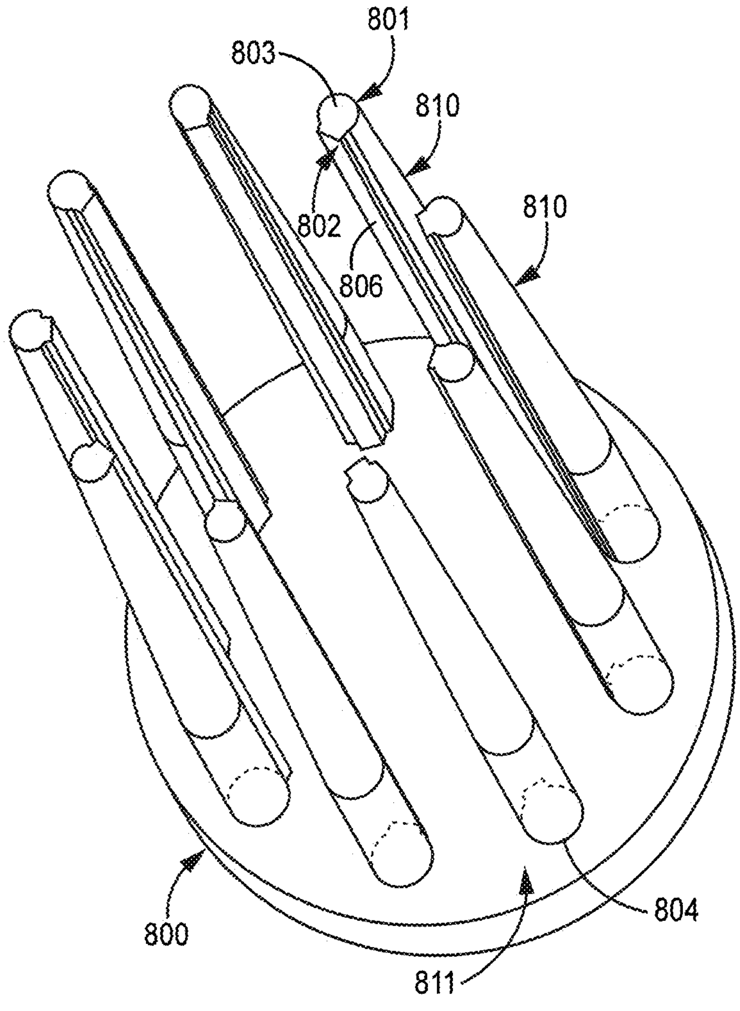

FIG. 8 illustrates one exemplary embodiment of a tool 800 that is configured to help create a coolant fluid pathway at a magnet wire assembly 8, for instance, such as at the concentrated winding pattern magnet wire assembly placed inside the electric motor shown at FIG. 7. The tool 800 can be used, for instance, in the method 800 to help create the cooling channel at the magnet wire assembly (e.g., to help create the cooling channel defined by the magnet wire assembly for a first portion of the cooling channel perimeter and defined by the magnet divider for a second, different portion of the cooling channel perimeter). FIG. 8A is a bottom plan view of a prong main body 801 and a prong divider interface projection 802 of the tool 800, FIG. 8B is an elevational view of the prong main body 801 and the prong divider interface projection 802 of the tool 800, and FIG. 8C is a bottom side perspective view of the tool 800 showing a plurality of prongs 810 at the tool 800.

As shown at FIG. 8C, the tool 800 can include a handling base 811 and a plurality of prongs 810. Each of the plurality of prongs 810 can extend out a prong longitudinal length 805 from one side of the handling base 811 and terminate at a free-floating end of each such prong 810. The prongs 810 can be spaced apart from one another about the handling base 811. For example, the prongs 810 can be spaced apart from one another about the handling base 811 in an orientation that corresponds to desired locations of coolant fluid pathways to be defined within the magnet wire assembly. Thus, the tool 800 can include a number of prongs 810 equal to a number of coolant fluid pathways desired to be created within the magnet wire assembly for a given application. And the tool 800 can include the prongs 810 of a geometric form that corresponds to a desired geometry of the coolant fluid pathways to be created within the magnet wire assembly using the tool 800. In one particular example not shown here, the handling base 811 can include a handle that is configured to be gripped by a hand of a user or a tool of a machine (e.g., robot) to help provide an interface for using the tool 800 and applying an actuation force at the tool 800.

As noted, the tool 800 can include one or more, such a plurality of, prongs 810. Each prong 810 can include a prong main body 801 and a prong divider interface projection 802. The prong main body 801 can define a prong bottom end 803 and a prong top end 804 that is opposite the prong bottom end 803 along a prong longitudinal length 805 of the prong main body 801. The prong top end 804 can be at the handling base 811 while the prong bottom end 803 can form a free-floating end. The prong divider interface projection 802 can extend radially outward from the prong main body 801 around a portion of a perimeter (e.g. circumference) of the prong main body 801, for instance, the prong divider interface projection 802 can extend radially outward from the prong main body 801 around a portion of the perimeter (e.g. circumference) of the prong main body 801 ranging from 10% to less than 50% of the perimeter (e.g. circumference) of the prong main body 801 at a given prong longitudinal length 805. The prong divider interface projection 802 can include a magnet divider interface surface 806. The magnet divider interface surface 806 can be located at a side of the prong divider interface projection 802 opposite the prong main body 801. As shown for the illustrated embodiment, the magnet divider interface surface 806 can be planar along its length 805, though in other embodiments the magnet divider interface surface 806 can be non-planar and to complement and correspond to the particular surface geometry at the magnet divider surface that interfaces with the magnet wire. The illustrated embodiment shows the prong divider interface projection 802 extending radially outward from the prong main body 801 along an entire longitudinal length 805 of the prong main body 801, though in other embodiments within the scope of this disclosure the prong divider interface projection 802 can extend radially outward from the prong main body 801 along some, but not all, of the longitudinal length 805 of the prong main body 801.

As noted, the tool 800 can be configured to help create a coolant fluid pathway at a magnet wire assembly 8 inside the electric motor. The prong divider interface projection 802 can be configured to interface with the magnet divider 20 inside the electric motor when the tool 800 is placed inside the electric motor to help prevent portions of the magnet wire assembly from accumulating at a portion of the magnet divider 20 where the magnet divider interface surface 806 is present at the magnet divider 20 when the tool 800 is placed inside the electric motor. Thus, the prong divider interface projection 802 having the magnet divider interface surface 806 can be configured to move portions of magnet wire assembly placed at step 601 away from at least a surface portion 20*a* of the magnet divider 20 (shown, e.g., at FIG. 3) to create a direct contact interface between the magnet divider interface surface 806 and the surface portion 20*a* of the magnet divider 20. For instance, the tool 800 can be placed inside the electric motor with the bottom end 803 of the one or more prongs 810 placed into contact with the magnet wire assembly that was placed at step 601 inside the electric motor. Then the tool 800 can be actuated by a user, for instance by pushing the tool 800 (e.g., by pushing at the handling base 811) into the magnet wire assembly at which the bottom end 803 of the one or more prongs 810 is in contact, to cause the one or more prongs 810 to create one or more corresponding coolant fluid pathways through the magnet wire assembly. While pushing the tool 800 into the magnet wire assembly, this tool actuation can include sliding the prong divider interface projection 802 of a respective prong 810 along an interfacing surface of the magnet divider to move a portion of the magnet wire assembly away from that interfacing surface of the magnet divider.

In some examples, such as that illustrated at FIGS. 5 and 8, it can be useful to create a converging geometry at the coolant fluid pathway, for instance using the tool 800. In particular, the exemplary tool 800 illustrated here has a converging cross-sectional geometry. For example, the prong main body 801 and the prong divider interface projection 802 can each converge in cross-sectional geometry along some or all of the longitudinal length 805 in a direction moving toward the bottom end 803. Thus, a cross-sectional width 807 of a given prong 810 (e.g., a cross-sectional width of the combined prong main body 801 and prong divider interface projection 802) can taper moving in a direction toward the bottom end 803. This converging geometry of the prong 810 can be useful in creating a coolant fluid pathway in the magnet wire assembly that has a corresponding converging cross-sectional diameter along a corresponding length of the cooling fluid pathway. The prong 810 can have its length 805 equal to a length of a linear extent of the cooling pathway desired through the electric motor.

At step 604, the method 600 includes applying one or more bonding agents to the magnet wire assembly inside the electric motor. For instance, the bonding agent can be applied at step 604 at exposed surfaces of the magnet wire assembly inside the electrical motor to cause the magnet wire assembly to adhere to the electric motor at the stator assembly, for instance including applying the bonding agent at the magnet wire assembly inside the electrical motor to cause the magnet wire assembly to adhere to (i) an inner, rotor facing side of the slot 13, (ii) an outer, opposite side of the slot 13, and (ii) to adjacent portions of the magnet wire between formed cooling fluid pathways. For example, referring to FIG. 3, bonding agent can be applied at step 604 at the magnet wire assembly inside the electrical motor to cause the magnet wire assembly to adhere to (i) an inner, rotor facing side portion of the slot 13 at bonding agent adherence point 850*a*, (ii) an outer, opposite side of the slot 13 at bonding adherence point 850*b*, and (ii) to adjacent portions of the magnet wire between formed cooling fluid pathways at bonding adherence point 850*c*. The application of the bonding agent, and its activation to provide such adherence at the magnet wire assembly, can thus help to keep the formed cooling channel in the magnet wire assembly. In addition, the application of the bonding agent, and its activation to provide such adherence at the magnet wire assembly, can help to transform the magnet wire assembly inside the electric motor into a self-supporting structure inside the electric motor as a result of bonding agent application at the magnet wire assembly (e.g., at bonding adherence point 850*c*). In some such examples, the bonding agent can be applied at substantially all exposed surfaces of the magnet wire assembly within the electric motor such that the bonding agent accumulates at, and over, such exposed surfaces of the magnet wire assembly.

In some such examples, step 604 of applying the bonding agent to the magnet wire assembly can occur after creating the cooling channel at step 603. For instance, step 604 of applying the bonding agent to the magnet wire assembly can occur after creating the cooling channel at step 603 but while the tool is still at the created cooling channel inside the electric motor. Thus, the tool can help to create the cooling channel inside the electric motor at step 603 and then be maintained at that created cooling channel to occupy that cooling channel and help shield that cooling channel from at least some of the applied bonding agent at step 604. The bonding agent can be configured to adhere the magnet wire in place inside the electric motor. For instance, the bonding agent can be applied to the magnet wire assembly at step 604 to cause the magnet wire assembly to adhere to a portion of the magnet divider that is spaced apart from the location of the magnet divider interface surface 806 at the magnet divider (e.g., to cause the magnet wire assembly to adhere to a portion of the magnet divider that is spaced apart from the surface portion 20*a* that is where at the magnet divider 20 the magnet divider interface surface 806 was located at steps 602 and 603 and maintained there for step 604).

At step 605, the method 600 includes activating the bonding agent to maintain the formed cooling channel at the magnet wire assembly. After the bonding agent is applied at the step 604, the bonding agent can be activated to cause the bonding agent to adhere the magnet wire assembly in place within the electric motor such that one or more cooling channels created in the magnet wire assembly at step 603 are maintained by the adherence provided via the applied and activated bonding agent. For instance, depending on the type of bonding agent used, the bonding agent can be activated at step 605 by passage of a preset time duration and/or application of heat that causes the applied bonding agent to cure at the magnet wire assembly to thereby cause the bonding agent to adhere the magnet wire assembly in place within the electric motor such that one or more cooling channels created in the magnet wire assembly at step 603 are maintained by this adherence provided by the bonding agent.

In some embodiments, the method 600 can include an additional step of removing the tool from the electric motor to reveal the cooling channel formed in the magnet wire assembly using the tool. For instance, after the bonding agent is applied at step 604 and/or after the bonding agent is activated to maintain the formed cooling channel at step 605, the method 600 can include a step of then removing the tool from the electric motor to reveal a primary cooling channel formed in the magnet wire assembly, formed using the tool, and extending through at least a portion of the stator assembly. Because the tool can occupy space that will serve as a cooling channel when the tool is removed, removing the tool from the magnet wire assembly inside the electric motor can thus cause such cooling channel to be revealed through the electric motor (e.g., extending through an entire longitudinal length of the stator assembly).

Various non-limiting exemplary embodiments have been described. It will be appreciated that suitable alternatives are possible without departing from the scope of the examples described herein. These and other examples are within the scope of this disclosure and ensuing claims therefrom.

What is claimed is:

1. A method for creating one or more coolant fluid pathways at a magnet wire assembly at an electric motor, the method comprising the steps of:

placing the magnet wire assembly inside the electric motor, wherein the magnet wire assembly comprises a conductive wire and an insulating member overlaying the conductive wire, the insulating member comprising expanded polytetrafluoroethylene (ePTFE);

after placing the magnet wire assembly inside the electric motor, inserting a tool into contact with the magnet wire assembly inside the electric motor;

while the tool is in contact with the magnet wire assembly, actuating the tool to define a coolant fluid pathway at the magnet wire assembly, wherein the ePTFE defines, at least in part, the coolant fluid pathway at the magnet wire assembly such that when a cooling fluid passes through the coolant fluid pathway the cooling fluid directly contacts the ePTFE;

applying a bonding agent to the magnet wire assembly; and after applying the bonding agent to the magnet wire assembly, activating the bonding agent to maintain the coolant fluid pathway through the magnet wire assembly.

2. The method of claim 1, wherein the tool comprises a prong, the prong including a prong main body and a prong divider interface projection, the prong divider interface projection extending radially outward from the prong main body and around some but not all of a portion of a perimeter of the prong main body, and wherein inserting the tool into contact with the magnet wire assembly inside the electric motor comprises inserting the prong main body of the tool into contact with the ePTFE of the magnet wire assembly inside the electric motor and inserting the prong divider interface projection of the tool into contact with a magnet divider inside the electric motor.

3. The method of claim 2, wherein actuating the tool to define the coolant fluid pathway at the magnet wire assembly comprises sliding the prong divider interface projection of the tool along a length of the magnet divider inside the electric motor.

4. The method of claim 3, wherein the prong has a prong top end and an opposite prong bottom end, wherein a cross-sectional width of each of the prong main body and the prong divider interface projection of the prong tapers along a length of the prong from the prong top end to the prong bottom end.

5. The method of claim 1, wherein the bonding agent is applied at exposed surfaces of the magnet wire assembly inside the electric motor after the tool has been placed into contact with the magnet wire assembly.

6. The method of claim 5, the bonding agent is applied at exposed surfaces of the magnet wire assembly inside the electric motor while the tool occupies at least an open end portion of the coolant fluid pathway such that tool at least partially shields the coolant fluid pathway from receiving the applied bonding agent.

7. The method of claim 6, wherein activating the bonding agent to maintain the coolant fluid pathway through the magnet wire assembly comprises adhering the magnet wire assembly, via the bonding agent:

(i) at a first bonding adherence point to an inner, rotor facing side portion of a slot at a stator assembly of the electric motor, (ii) at a second bonding adherence point to an outer, opposite side portion of the slot at the stator assembly, and (iii) a third bonding adherence point to an adjacent portion of magnet wire assembly that is spaced apart from the cooling channel.

8. The method of claim 1, further comprising:

creating a secondary cooling channel, spaced apart from the coolant fluid pathway at the magnet wire assembly, through a rotor assembly of the electric motor by providing a secondary cooling channel inlet at the magnet wire assembly in fluid communication with the secondary cooling channel at the rotor assembly.

* * * * *